UNITED STATES PATENT OFFICE.

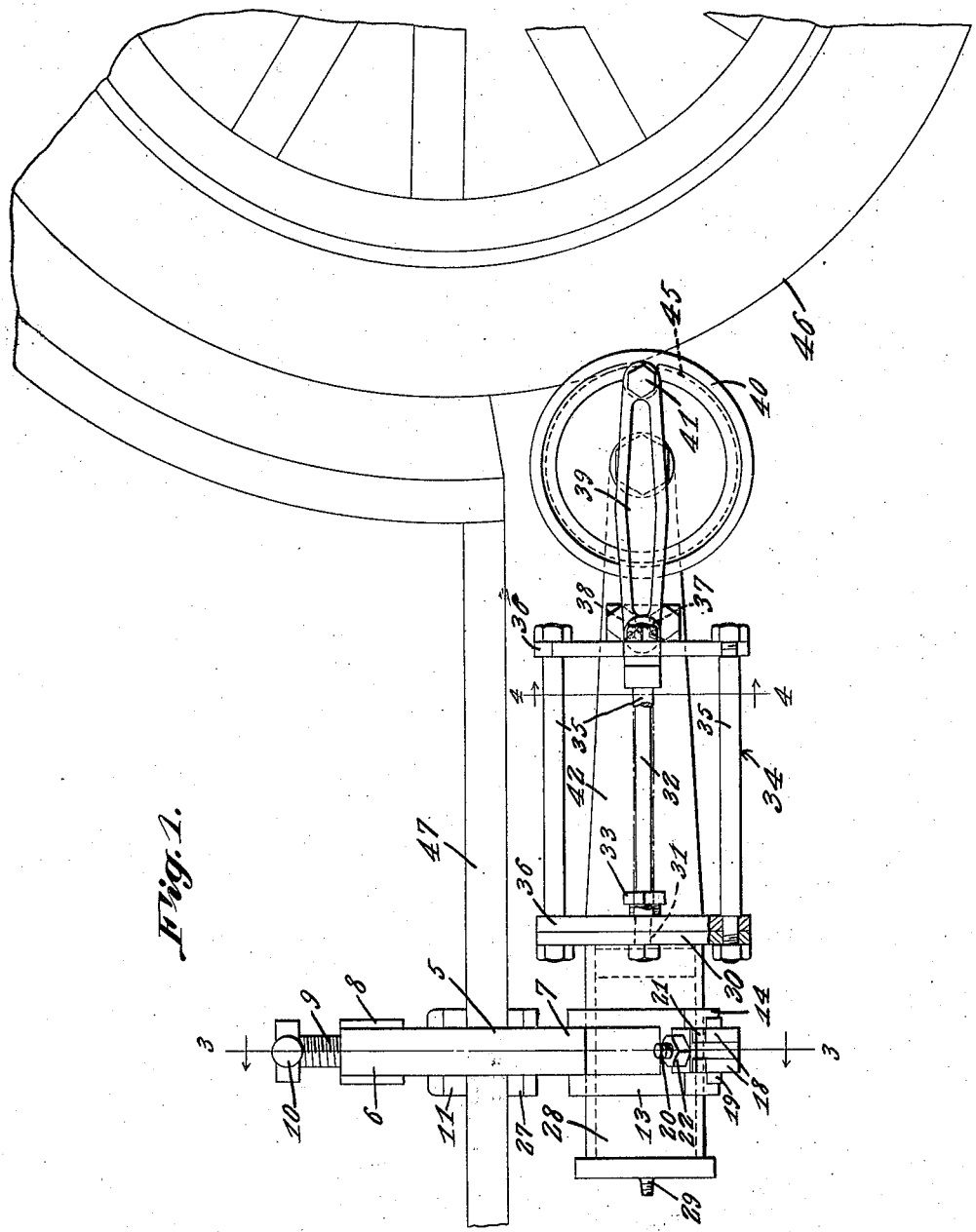

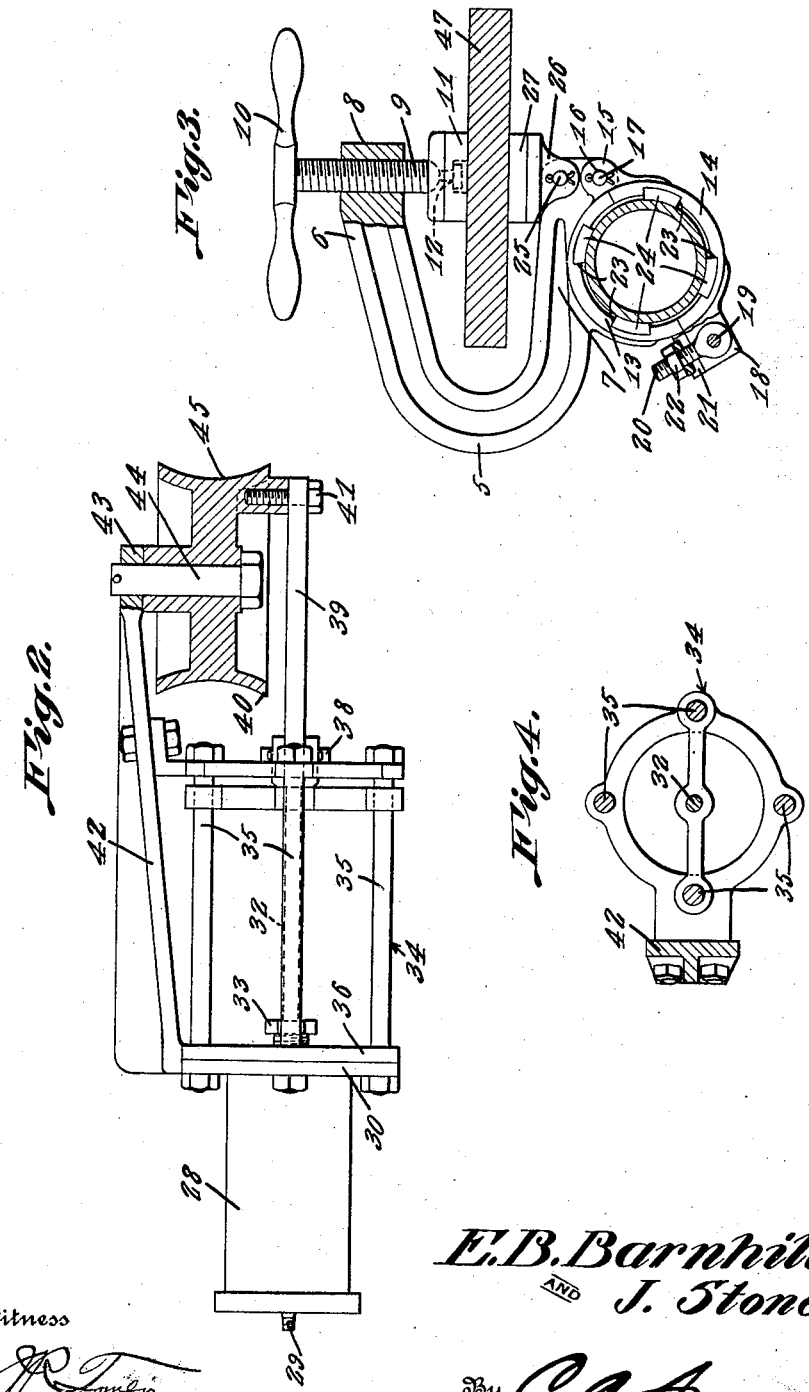

EDWARD B. BARNHILL AND JOHN STONE, OF INDIANAPOLIS, INDIANA.

AUTO-TIRE PUMP.

1,351,503.    Specification of Letters Patent.    Patented Aug. 31, 1920.

Application filed January 7, 1920. Serial No. 349,906.

*To all whom it may concern:*

Be it known that we, EDWARD B. BARNHILL and JOHN STONE, citizens of the United States, residing at Indianapolis, in the county of Marion, State of Indiana, have invented a new and useful Auto-Tire Pump, of which the following is a specification.

This invention relates to new and useful improvements in tire pumps, and more particularly to pumps of this character to be employed in connection with motor vehicles.

The primary object of the invention is to provide a novel form of pump adapted to be supported in contact with the periphery of an automobile tire, to receive rotary motion therefrom, to cause the operation of the pump.

A further object of the invention is to provide a pump construction including a bracket, capable of attachment to the running board of a motor car for properly supporting the pump, when in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a fragmental elevational view of an automobile running board with a device constructed in accordance with the present invention applied thereto.

Fig. 2 illustrates a plan view of the device, the support being removed, the power wheel thereof being shown in section.

Fig. 3 illustrates a sectional view taken on line 3—3 of Fig. 1, and

Fig. 4 illustrates a sectional view taken on line 4—4 of Fig. 1.

Referring to the drawings in detail, the invention includes a clamping member comprising a body portion 5, curved to provide opposed arms 6 and 7, the arms 6 having an enlargement 8 formed at one end thereof, the same being apertured to receive the threaded shank 9 of the jaw operating handle 10, the jaw 11 being supported adjacent the lower end of the threaded shank 9 by means of the head and socket connection 12, which connection 12 permits the threaded shank 9 to be rotated within the enlargement 8 to move the jaw 11 with relation to the enlargement 8 to accomplish the clamping result.

The lower arm 7 is provided with a semi-circular member 13 and a semi-circular member 14 coöperating therewith to provide a circular collar, the semi-circular member 14 having a wing 15 apertured as at 16 to receive the pivot pin 17 for permitting the member 14 to move toward and away from the semi-circular member 13 so that the cylinder may be disposed between the members 13 and 14 and securely clamped therein. The member 14 is provided with spaced ears 18 apertured to receive the pin 19, which pin 19 forms a bearing for the eye bolt 20 passing through an opening formed in the lug 21, the nut 22 being positioned on the threaded end of the bolt 20 to secure the members 13 and 14 in proper clamping relation with each other.

Formed within the curved surfaces of the members 13 and 14, are the dove-tailed slots 23, which are disposed in spaced relation with each other and are provided for the purposes of supporting blocks of fiber indicated at 24, the walls of the fiber blocks being angular in formation to properly fit within the dove-tailed slots 23, so that portions of the respective blocks of fiber material extend beyond the inner wall of each other, the members 13 and 14, in a manner to embrace or grasp the pump barrel, to be hereinafter more fully described, the same being constructed to be supported by the bracket member.

The end of the arm 7 is apertured to receive the pin 25 which also passes through the apertured ears 26 formed in the jaw 27 coöperating with the jaw 11 for accomplishing the clamping result, the pin together with the apertured ears 26 providing connection between the jaw and arm 7 to allow the jaw 27 to pivot with relation to the arm.

The pump forming an important feature of the present invention includes the barrel 28 which is provided with the usual exhaust nipple 29 for providing a connection with the pump barrel 28 and the tire valve, not shown, which is receiving the air from the pump barrel 28 the upper portion of the pump barrel being closed by a threaded cap 30 apertured as at 31 to receive the plunger rod 32.

This plunger rod operates through a suitable packing gland 33 positioned in the aperture 31 for providing an air tight connection between the plunger rod 32 and pump valve, the plunger rod being shown as operating through a frame 34 including the connecting bars 35 and end plates 36 providing a connection between the connecting bars at the ends thereof.

Opening 37 is provided in one end of the plunger rod 32 and provides a bearing for the pin 38 which passes through an opening formed in one end of the connecting rod 39, the opposite end of said connecting rod having pivotal connection with the power wheel 40, through the medium of the pin 41 mounted eccentrically on the wheel 40, so that rotary movement of the wheel 40 produces a reciprocating movement of the plunger rod 32 with the result that the usual plunger, not shown, and formed on one end of the plunger rod 32 will operate within the pump barrel to cause air to be forced from the pump barrel.

Supported by the frame 34 is a bracket member 42, which includes a relatively long arm having a bearing 43 formed at one end thereof, the bearing 43 accommodating the stub shaft 44 which also passes through an opening in the power wheel 40, the periphery of which is concaved as at 45 to conform to the contour of the tread of an automobile tire so that rotation of the automobile tire 46, causes a relative rotation of the power wheel 40, with the result that reciprocating motion is imparted to the plunger rod 32 and plunger carried thereby.

In operation, the clamping members 11 and 27 are properly positioned on the running board 47 of an automobile so that the pump barrel, which is supported by the members 13 and 14 will be secured to the running board, the wheel 40 lying in close engagement with the periphery of the automobile tire associated therewith. The wheels are now jacked off of the surface on which the machine is supported and power applied to the rear wheels, with the result that as before stated, the plunger rod 32 is reciprocated within the pump barrel.

Having thus described the invention, what is claimed is:—

1. An automobile tire pump including a bracket adapted to be clamped to the running board of an automobile, a pump supporting bracket including semi-circular members, a pump barrel adapted to be positioned within the semi-circular members, a frame carried by the pump barrel, a power wheel adapted to contact with the periphery of an automobile wheel, a plunger rod having connection with the power wheel whereby movement of the automobile wheel produces a relative movement of the power wheel to cause the reciprocation of the plunger rod.

2. An automobile tire pump including a bracket, clamping members carried by the bracket and adapted to clamp to the running board of an automobile, semi-circular clamping members supported by the bracket, a pump including a barrel adapted to be embraced by the semi-circular clamping members, a power wheel supported by the pump, said power wheel having a concaved periphery adapted to contact with an automobile wheel, a plunger rod having connection with the power wheel whereby rotary movement of the power wheel produces a reciprocating movement of the plunger rod, and means within the semi-circular clamping members for preventing displacement of the pump barrel from the semi-circular clamping members.

3. An automobile tire pump including a bracket member, adjustable clamping jaws supported by the bracket member and adapted to clamp the running board of an automobile, semi-circular clamping members carried by the bracket member, fiber blocks supported by the semi-circular clamping members, a pump including a circular pump cylinder adapted to be embraced by the semi-circular clamping members, and means carried by the pump and contacting with an automobile tire for causing the pumping of air within the pump barrel.

4. An automobile tire pump including a bracket member, clamping jaws carried by the bracket member for securing the bracket member to an automobile running board, semi-circular clamping members, means for pivotally connecting one of the clamping members to the other clamping member, a pump including a pump barrel, supported by the semi-circular clamping members, a frame carried by the pump barrel, an arm having connection with the frame and supporting a power wheel, a plunger rod operating through the frame, and means for connecting the power wheel and plunger rod, whereby rotary movement of the power wheel causes a reciprocating movement of the plunger rod.

5. An automobile tire pump including a bracket member, adjustable clamps supported by the bracket member for securing the same to the running board of an automobile, a bracket including semi-circular members having dove-tailed slots formed therein, fabric blocks having inclined walls supported within the dove-tailed slots, a pump including a circular barrel embraced by the semi-circular members, a power wheel forming a part of the pump and contacting with an automobile wheel for causing rotation of the power wheel, and a pump rod having connection with the power wheel and operating in the pump barrel.

In testimony that we claim the foregoing as our own, we have hereto affixed our signatures in the presence of two witnesses.

EDWARD B. BARNHILL.
JOHN STONE.

Witnesses:
B. W. SMOCK,
D. L. JONES.